United States Patent
Miyahara

(10) Patent No.: US 10,061,550 B2
(45) Date of Patent: Aug. 28, 2018

(54) PRINTER MULTIFUNCTION SYSTEM HAVING SCANNER CONTROLLED DATA TRANSMISSION

(71) Applicant: CANON KABUSHIKI KAISHA, Tokyo (JP)

(72) Inventor: Katsutoshi Miyahara, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/468,709

(22) Filed: Mar. 24, 2017

(65) Prior Publication Data

US 2017/0286035 A1 Oct. 5, 2017

(30) Foreign Application Priority Data

Mar. 31, 2016 (JP) ................. 2016-070689

(51) Int. Cl.
*G06F 3/12* (2006.01)
*H04N 1/00* (2006.01)

(52) U.S. Cl.
CPC ......... *G06F 3/1286* (2013.01); *G06F 3/1203* (2013.01); *G06F 3/1236* (2013.01); *H04N 1/00411* (2013.01); *H04N 2201/0094* (2013.01)

(58) Field of Classification Search
None
See application file for complete search history.

(56) References Cited

U.S. PATENT DOCUMENTS 8,814,304 B2  8/2014 Miyahara
2005/0046887 A1* 3/2005 Shibata .............. H04N 1/00204
 358/1.13

FOREIGN PATENT DOCUMENTS

JP 2006-154949 6/2006

* cited by examiner

*Primary Examiner* — Andrew H Lam
(74) *Attorney, Agent, or Firm* — Fitzpatrick, Cella, Harper & Scinto

(57) ABSTRACT

A printer multifunction system includes a printer having a printer controller and a scanner having a scanner controller and a memory configured to store data obtained by reading a print original by a sensor. The printer and the scanner are connected to a network to which a computer is connected, wherein the scanner controller determines whether to transmit the data stored in the memory to the printer or the computer, based on at least one of a state of the printer, a reading setting of the scanner, and a state of the memory, and causes the scanner to transmit the data stored in the memory to a destination determined by the scanner controller. The printer controller receives the data from the scanner in a case where the data is transmitted to the printer, and receives the data from the computer in a case where the data is transmitted to the computer from the scanner, and the printer controller causes the printer to execute a printing operation, based on the data.

19 Claims, 10 Drawing Sheets

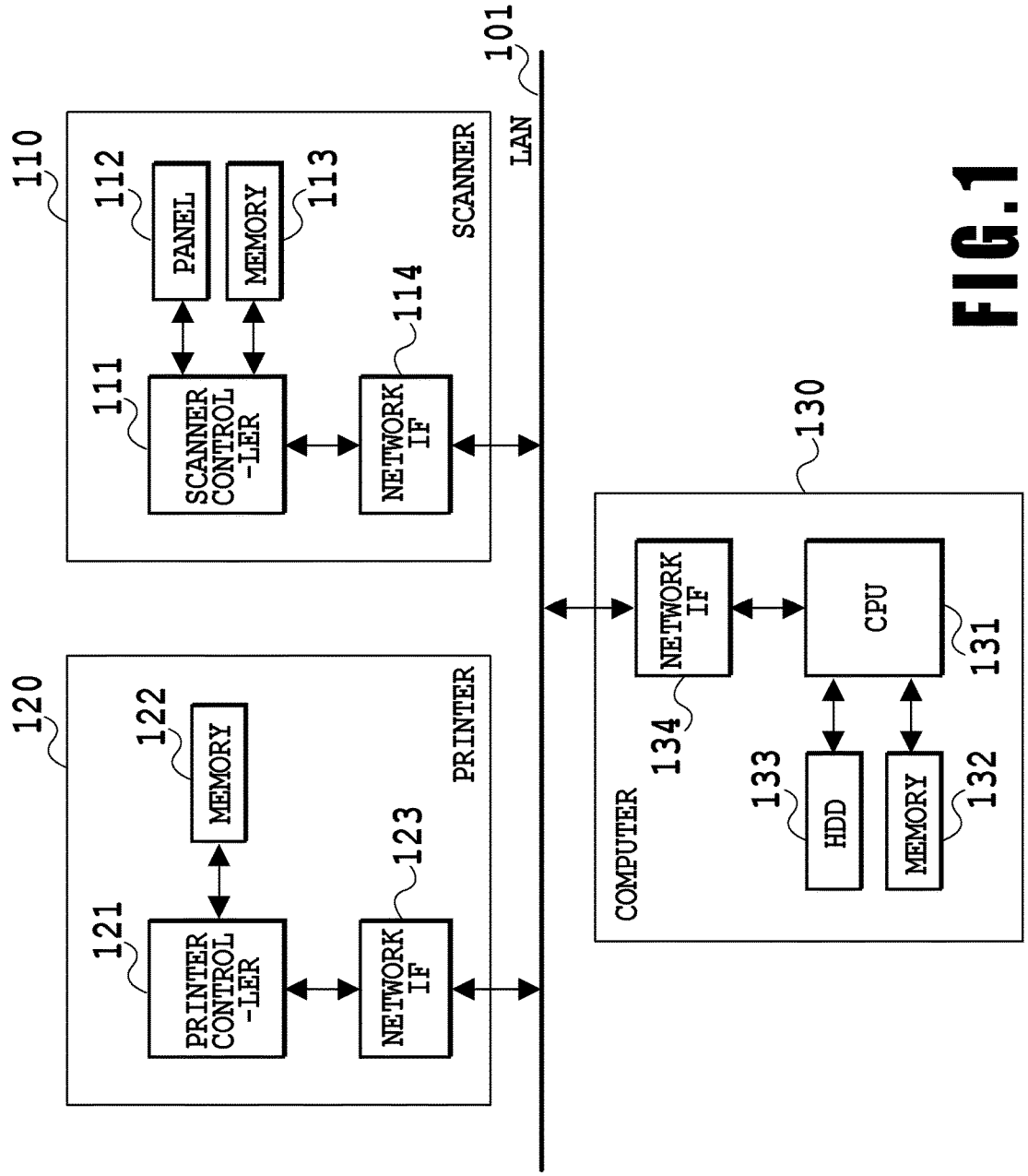

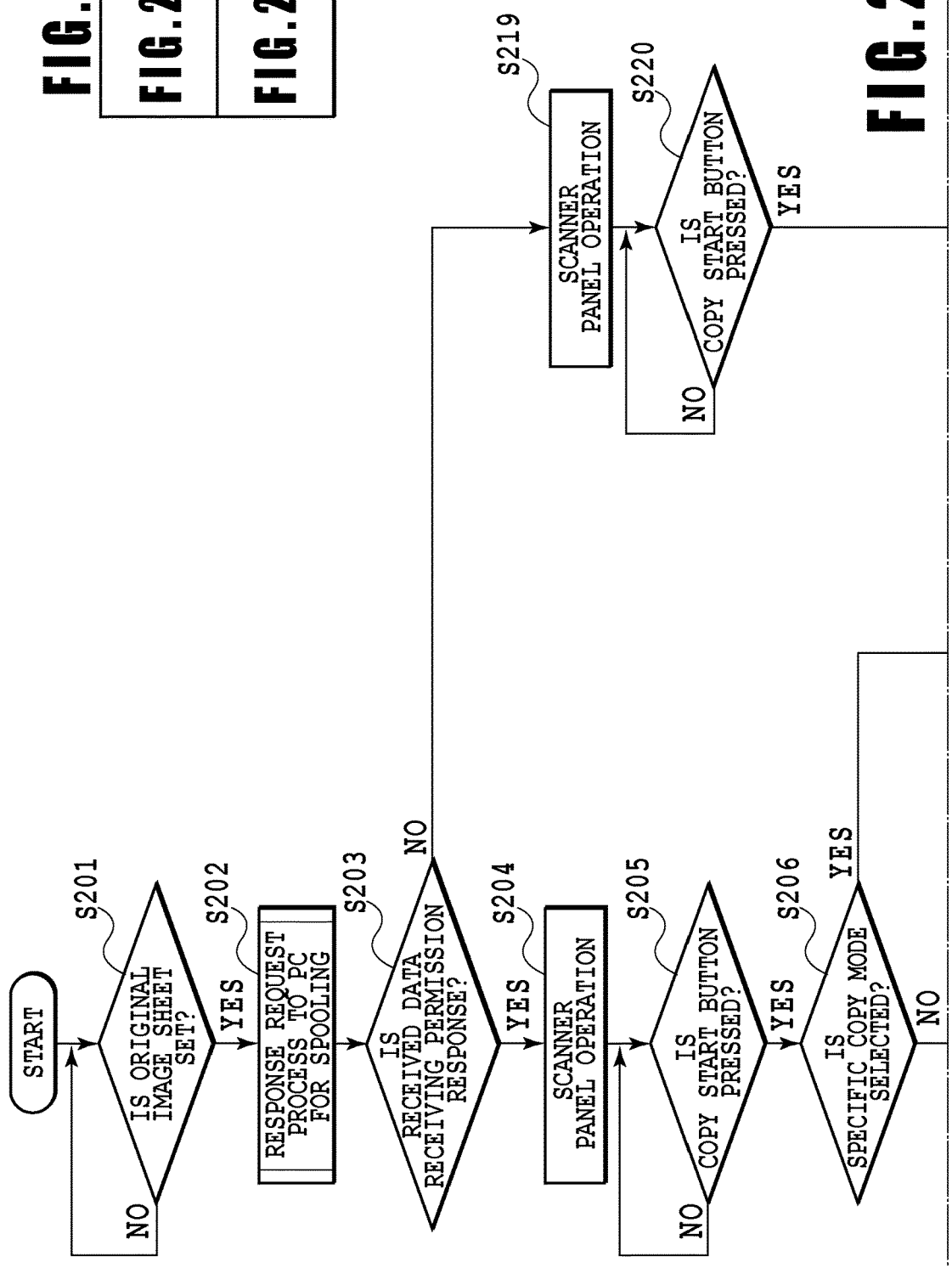

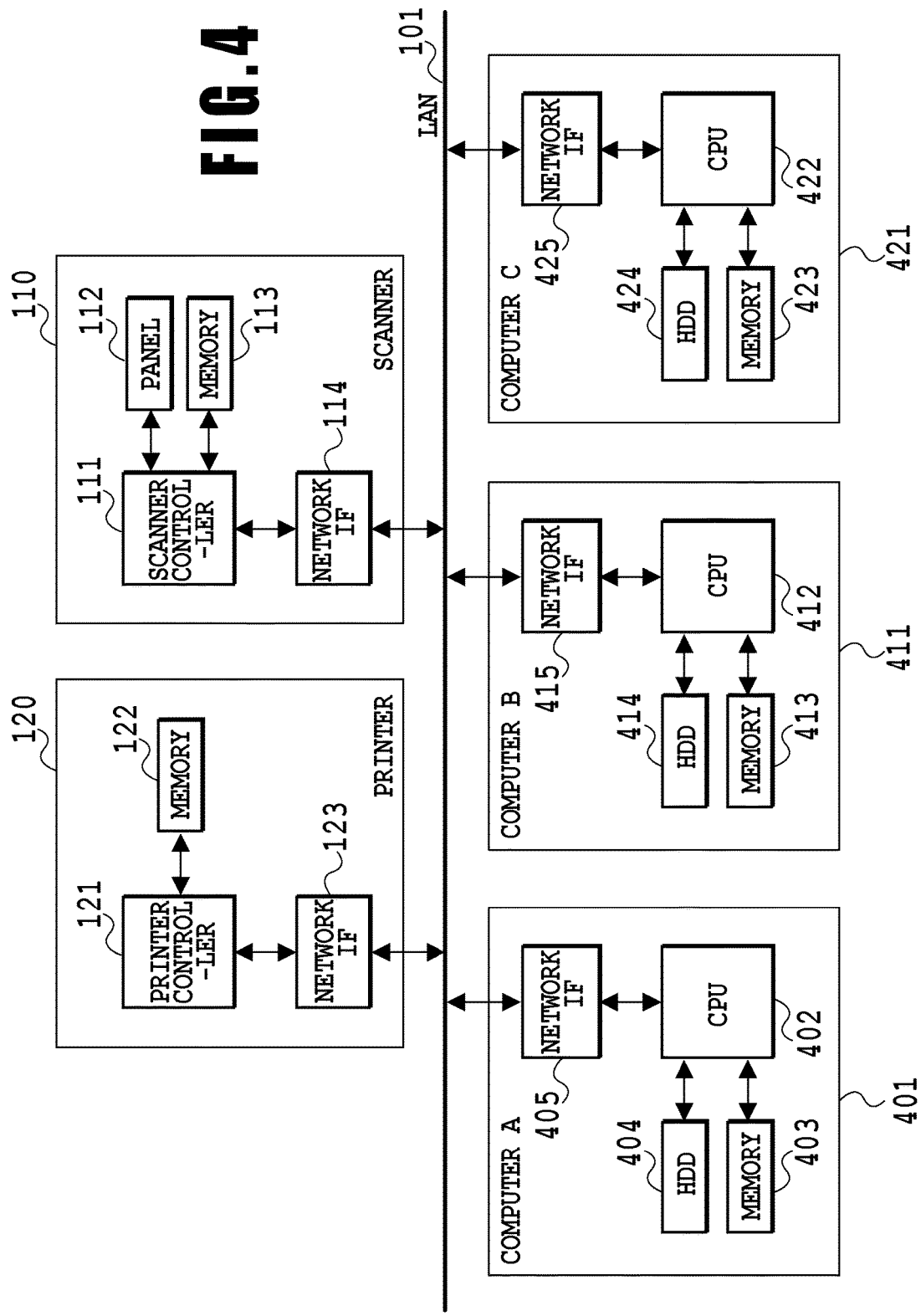

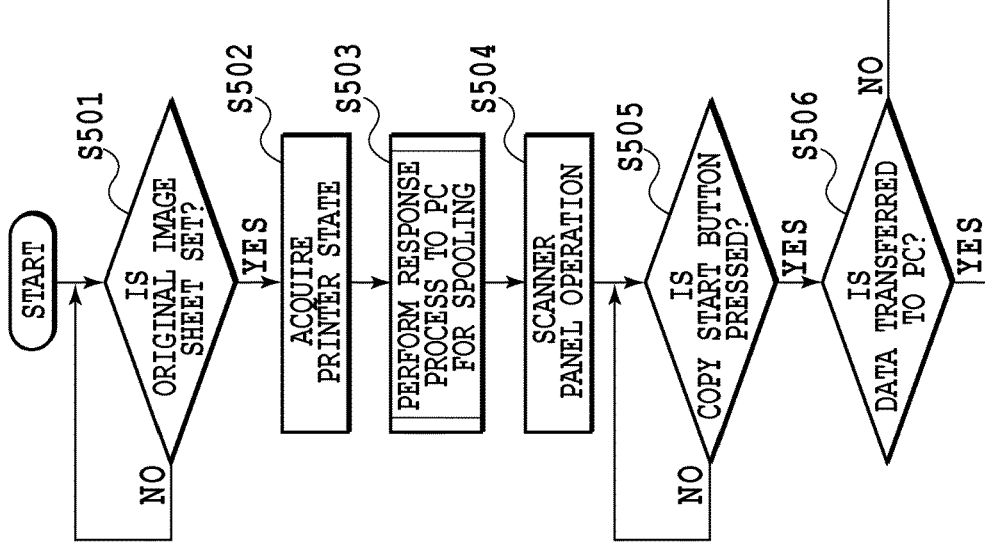

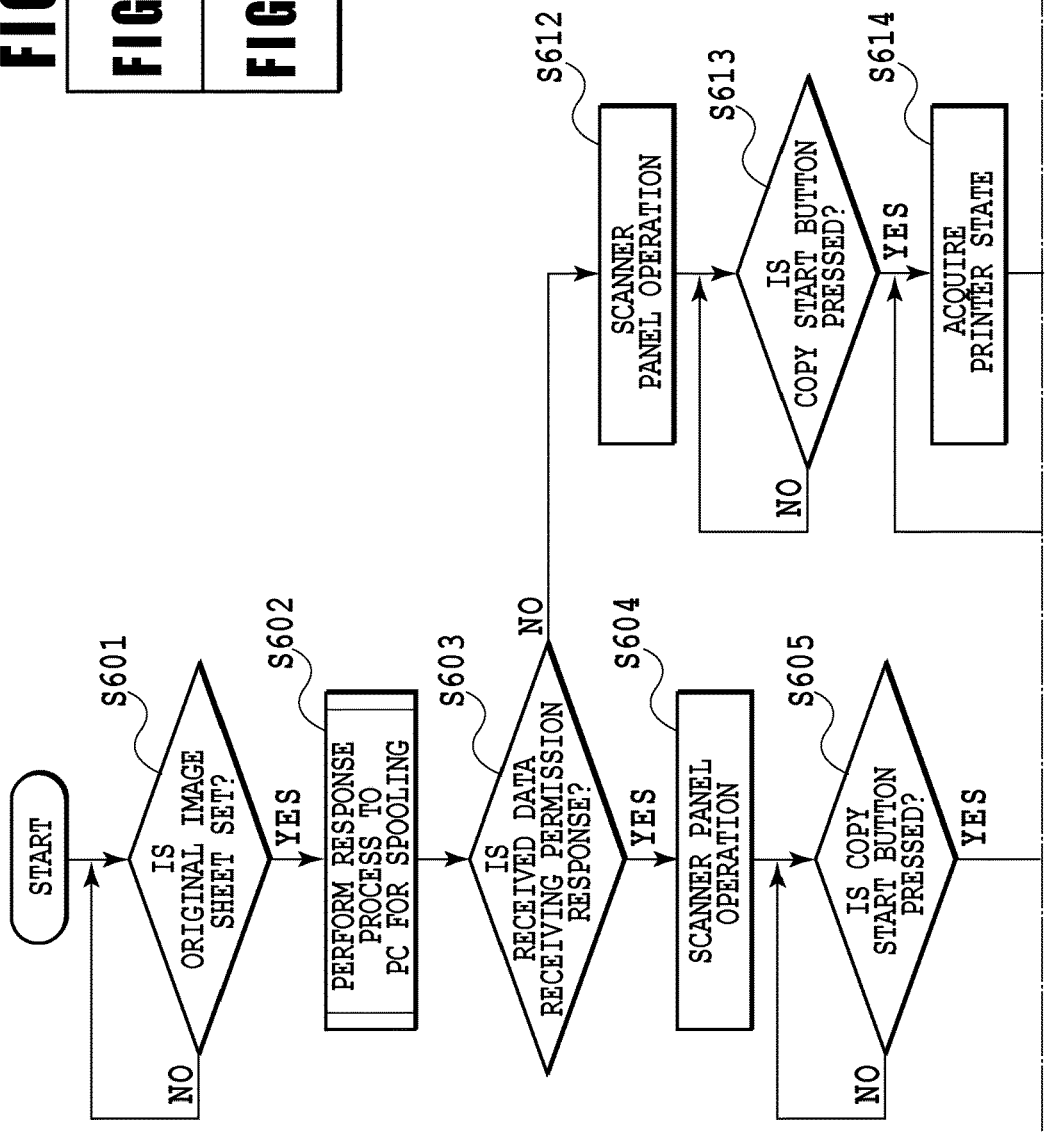

PRINTER MULTIFUNCTION SYSTEM HAVING SCANNER CONTROLLED DATA TRANSMISSION

BACKGROUND OF THE INVENTION

Field of the Invention

The present invention relates to a printer multifunction system, a scanner and a storage medium, and more particularly, to a printer multifunction system configured by combining a single printer and a single scanner that are connected to a network.

Description of the Related Art

An example of a printer multifunction system is disclosed in Japanese Patent Laid-Open No. 2006-154949. Japanese Patent Laid-Open No. 2006-154949 describes the system that, for example, transmits image data read by a scanner to a host computer in the form of a file format or makes a printer print the image data.

However, in the system of Japanese Patent Laid-Open No. 2006-154949, a user needs to select and set a data output destination among the printer and the host computer for outputting, for example, the data read by the scanner, by performing an operation on the host computer. As a result, a problem arises in that an operation for setting the data output destination is complicated.

SUMMARY OF THE INVENTION

An object of the invention is to provide a printer multifunction system, a scanner and a storage medium that are capable of determining a transmitting destination of data read and obtained by a scanner without any complicated operation of a user.

In a first aspect of the present invention, there is provided a printer multifunction system configured to include a printer, a scanner, and a computer connected to a network, the system comprising: a determination unit configured to determine whether to transmit data read by the scanner to the printer or the computer, based on at least one of a state of the printer, a reading setting of the scanner, and a state of a memory for storing the data; a control unit configured to cause the scanner to read a print original and transmit data obtained by reading the print original to a destination that is determined by the determination unit; and a printing execution unit configured to cause the printer to execute a printing operation, based on the data which the scanner is caused to transmit by the control unit or the data which is caused to transmit to the computer by the control unit to be temporarily stored in the computer and transmitted from the computer.

In a second aspect of the present invention, there is provided a scanner connected to a network to which a printer and a computer are connected, the scanner comprising: a determination unit configured to determine whether to transmit read data to the printer or the computer, based on at least one of a state of the printer, a reading setting of the scanner, and a state of a memory for storing the data; a control unit configured to read a print original and transmit data obtained by reading the print original to a destination that is determined by the determination unit; wherein the printer executes a printing operation, based on the data which the scanner is caused to transmit by the control unit or the data which is caused to transmit to the computer by the control unit to be temporarily stored in the computer and transmitted from the computer.

In a third aspect of the present invention, there is provided a non-transitory storage medium storing a program executed by an information processing apparatus connected to a network to which a printer and a scanner are connected, the program causing the information processing apparatus to perform processing comprising the steps of: receiving a response request signal from the scanner; determining whether the printer capable of executing a printing operation exists by analyzing the received response request signal; and returning a response signal which permits the transmission of the data to the scanner when the determining step determines that the printer is capable of executing the printing operation exists.

According to the above-described configuration, it is possible to determine a destination of data read and obtained by a scanner without any complicated operation of a user.

Further features of the present invention will become apparent from the following description of exemplary embodiments with reference to the attached drawings.

BRIEF DESCRIPTION OF THE DRAWINGS

FIG. 1 is a block diagram illustrating a configuration of a MFP system according to a first embodiment of the invention;

FIG. 2 is a diagram showing the relationship of FIGS. 2A and 2B;

FIG. 2A is a flowchart illustrating a process of a copy operation of the MFP system according to the first embodiment;

FIG. 4 is a block diagram illustrating a configuration of a MFP system according to a second embodiment of the invention;

FIG. 5 is a diagram showing the relationship of FIGS. 5A and 5B;

FIG. 5A is a flowchart illustrating a process of a copy operation of a MFP system according to a third embodiment of the invention;

FIG. 6 is a diagram showing the relationship of FIGS. 6A and 6B;

FIG. 6A is a flowchart illustrating a process of a copy operation of a MFP system according to a fourth embodiment of the invention;

DESCRIPTION OF THE EMBODIMENTS

Figure 2B:
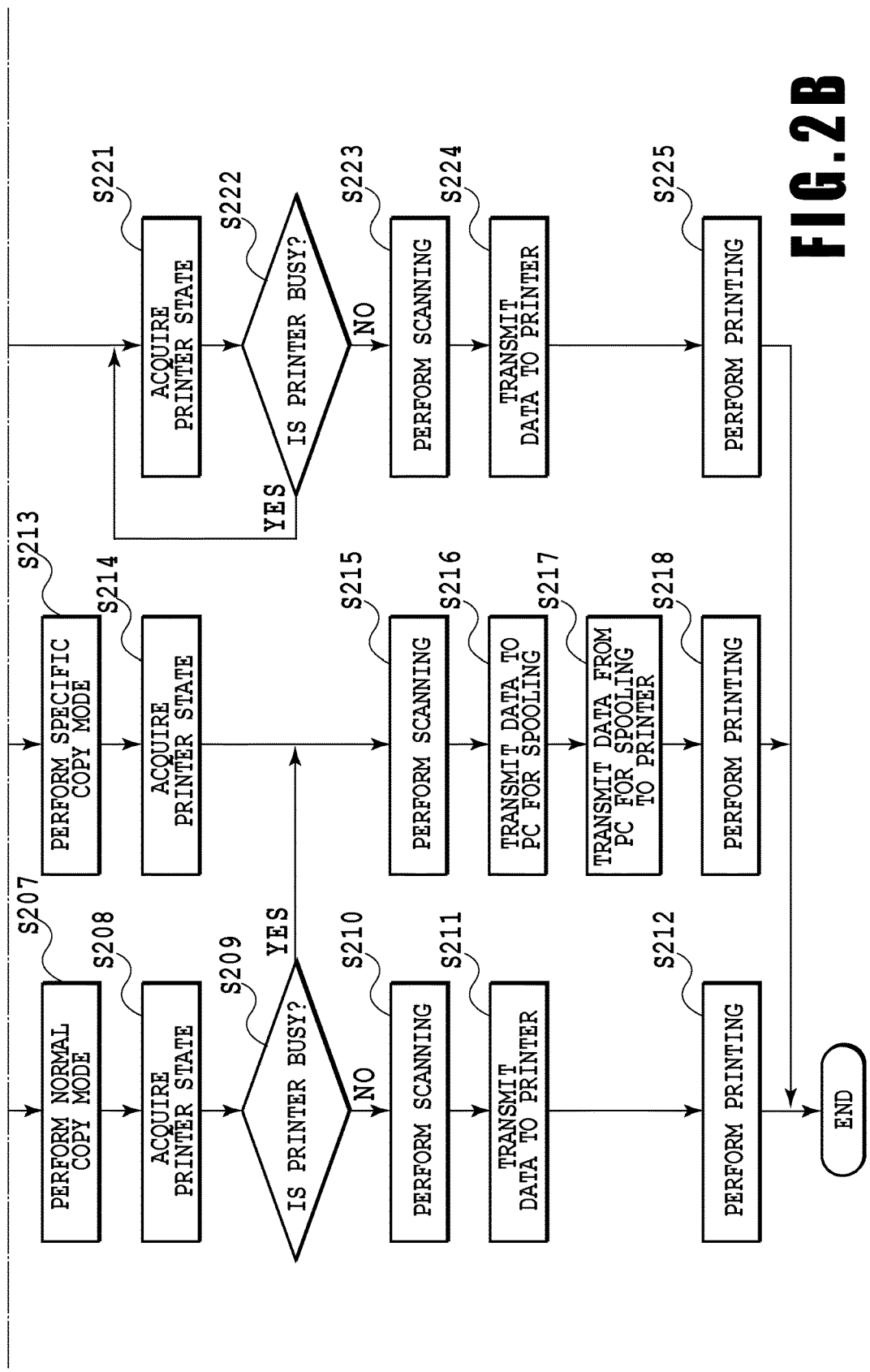
FIG. 2B is a flowchart illustrating a process of a copy operation of the MFP system according to the first embodiment.

Hereinafter, embodiments of the invention will be described in detail with reference to the drawings. The following embodiment is related to an MFP system including an inkjet printer, but the invention is not limited to this embodiment. The printing method may be, for example, other printing methods such as an electro photographic method.

First Embodiment

FIG. 1 is a block diagram illustrating a configuration of a MFP system (a printer multifunction system) according to a first embodiment of the present invention. A network 101 is represented as an Ethernet (trademark) or the like. The MFP of the embodiment is able to read a large-format print original and print an image on a large-format print sheet. From this point, it is desirable that the network 101 comply with the standard of 1000 BASE-T or higher in consideration of a maximum data transmission rate. A scanner 110 is able to read a print original a size of which is equal to or smaller than the width of A0 corresponding to the network. Since the scanner 110 is of a feed type, a reading position is fixed and an original is read while the print original is conveyed. The print original is set one by one by a user. An inkjet printer (hereinafter, a printer) 120 is able to print an image on a print sheet size of which is equal to or smaller than the width of A0 corresponding to the network. A computer (an information processing apparatus) 130 is connected to the network 101 and controls a copy operation of a system involving with the copy operation to be described later.

The scanner 110 includes a scanner controller 111 which is configured by an ASIC or a FPGA and processes read data output from a line sensor (not shown). An operation panel 112 is provided at the scanner 110 and includes an LCD, a touch panel, a hard key, and an LED (not shown). A main memory 113 is a DDR SDRAM or the like and is connected to the scanner controller 111. A network interface 114 is used to transmit data, which is read by the scanner and is processed by the scanner controller 111, to the printer 120 or the computer 130 via the network 101. The printer 120 includes a printer controller 121 which is configured by an ASIC or the like and controls the driving of the printer 120 and processes print data. The main memory 122 is a main memory such as a DDR SDRAM and is used as a buffer that temporarily stores signals which are used to drive a print head (not shown) and are obtained by converting the print data using the printer controller 121. A network interface 123 is used to deliver the print data from the scanner 110 or the computer 130 to the printer controller 121 via the network 101. The computer 130 includes a CPU 131, a main memory 132, a HDD 133, and a network interface 134.

The scanner 110 and the printer 120 can be independently operated. For example, the scanner 110 is connected to the computer 130 having a dedicated driver/application installed therein via the network 101 or a USB interface (not shown) and is able to store scanner data obtained by the scanner 110 in the computer 130. Further, the printer 120 is connected to the computer 130 having a dedicated printer driver installed therein via the network 101 or a USB interface (not shown) and is able to print image data on the computer by the printer 120.

The scanner 110 of the embodiment includes a driver for the printer 120. When the scanner and the printer are connected to the same network 101, a copy operation can be performed without using the computer 130. In this way, the MFP system is configured as described above. In a case where data is directly transmitted from the scanner 110 to the printer 120 via the network 101, there is a need to transmit the data from the scanner 110 while an IP address and the like of the printer 120 are designated. For this reason, the user designates the destination printer by previously inputting information on the destination printer using the operation panel 112 or by selecting the printer from among printer information on a display which is automatically collected from the network by the scanner 110. Data having read from a sensor (not shown) is transmitted to the scanner controller 111 and is transmitted to the printer 120 after the data is converted to be able to be received and printed by the printer 120. In any case of a device of a transmission source being the scanner 110 or the computer 130, the printer needs not to particularly consider the device of the transmission source because the equivalent data is transmitted to the printer 120.

As for an application example of the present invention, a function expansion application for the MFP system is installed in the computer 130. When the application is activated for the first time after the application is installed, a folder on the HDD 133 for spooling copy data is designated. Also, a space that can be allocated to the folder is specified in response to the necessity. In a case where the application can store the scanner data as electronic data in the HDD 133 of the computer 130, a folder that stores the data is also designated. These settings can be changed at all times. When the application is set to automatically start and reside at the time of the activation of the computer 130, an operation of the user who wants to perform the copy operation can be omitted.

FIGS. 2A and 2B are flowcharts illustrating a process of a copy operation in the MFP system according to the first embodiment of the present invention. When the copy operation is performed, all equipment needs to be turned on. In a standby state, the scanner 110 waits for a print original to be set. When the user sets the print original, the scanner 110 detects the setting of the print original by a sheet sensor (not shown) (S201) and conveys the print original to a reading position by rotating a conveying roller (not shown) (S201). When the print original is conveyed to a reading start position, the scanner 110 transmits a response request signal to the network 101 along with information on the printer to be used for the copy operation in order to search the computer 130 for spooling copy data (S202).

Figure 3:
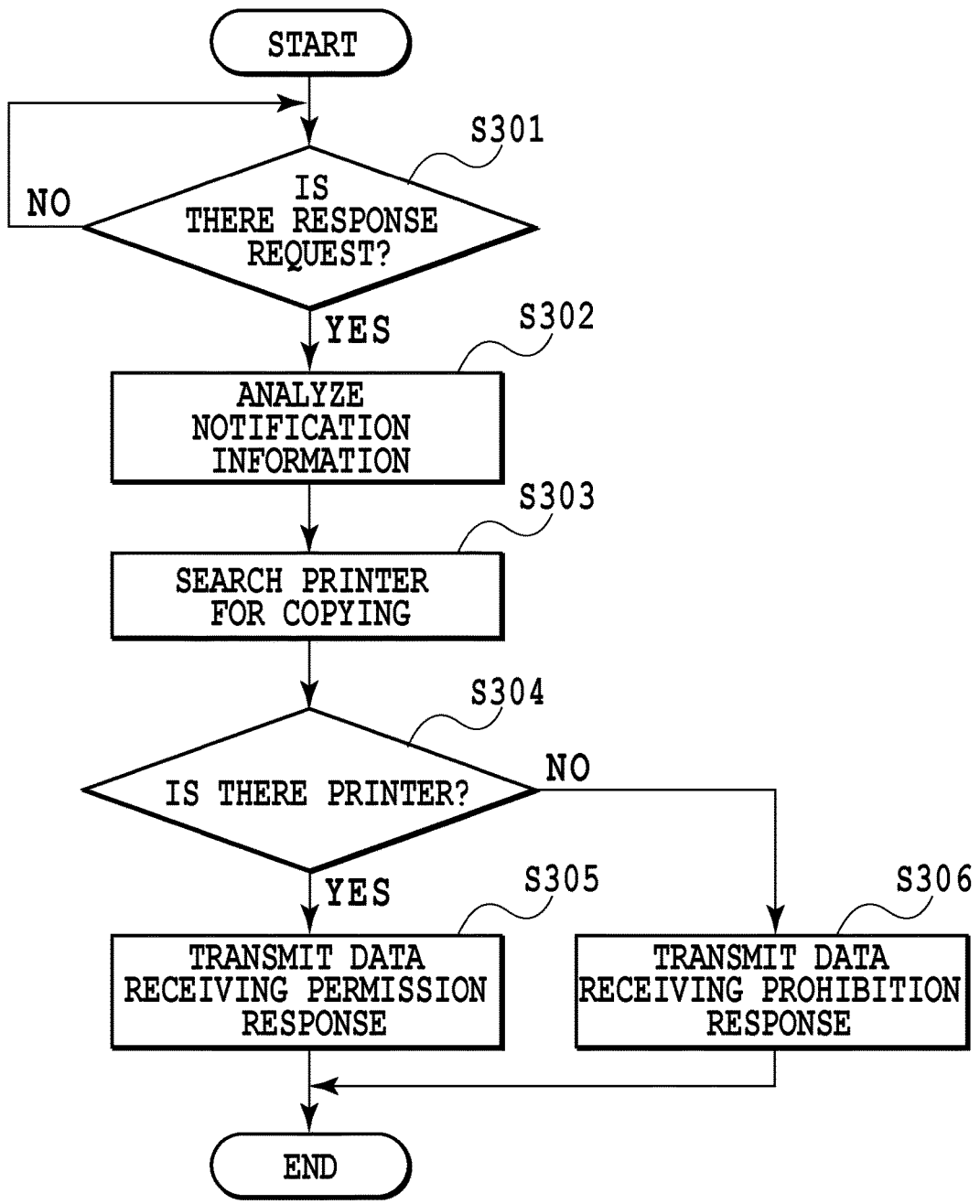
FIG. 3 is a flowchart illustrating details of a response process of a computer having an activated spool application according to the first embodiment.

FIG. 3 is a flowchart illustrating details of a response process of the computer 130 having an activated spool application according to the embodiment. When the application of the computer 130 is activated, the computer waits for the response request signal which is transmitted from the scanner 110 via the network 101 (S301). When the computer 130 receives the response request signal from the scanner 110 via the network 101, the application analyzes notification information and acquires the IP address of the printer 120 which will print an image obtained by the copy operation among the received information (S302). Next, the application searches the printer 120 connected to the network 101 by using the acquired IP address (S303). Then, when there is a response from the printer 120 during this searching (S304), the application determines that the data can be transmitted to the printer 120 of a specific copy destination and returns a response signal which permits the receiving of the data to the scanner 110 having requested the response (S305). On the other hand, when there is no response from the printer 120, the application determines that the data cannot be transmitted to the printer 120 of the copy destination and returns a response signal which prohibits the receiving of the data to the scanner 110 having requested the response (S306).

Again, FIGS. 2A and 2B will be referred. The scanner 110 receives the response signal from the computer 130 in response to the transmission of the response request signal (S203). Then, when the received response signal indicates a state where the data can be received, the scanner 110 displays a state where a long sized print original can be read and a plurality of print originals can be continuously read on a display unit (not shown) of the operation panel 112. Then, the user operates the operation panel 112 to set a reading resolution of the scanner 110 for the copy operation or print settings for the printer 120 and to select a long print original mode or a continuous reading mode for the print original that is displayed in accordance with a processing purpose for determining an operation mode. The scanner 110 receives the input according to the above operation on the operation panel (S204). After the copy setting ends, the user presses a copy start button on the operation panel 112 and the scanner receives the start input (S205), the scanner 110 determines a current copy mode according to the copy setting (S206).

In a case where the copy setting is equal to or smaller than a print original size standardized by the scanner 110 (A0 in this example) and is not a case of reading a plurality of print originals, a process is performed as a normal copy mode (S207). On the other hand, when the long print original mode or the continuous reading mode is selected, a process is performed as a specific copy mode (S213).

When the specific copy mode is determined (S206, S213), the scanner 110 acquires the state of the printer 120 (S214) and reads the print original after confirming that the printer 120 is operable (S215). The scanner 110 conveys the print original at a constant speed and sequentially reads images by a fixed line sensor. The read image data is processed by the scanner controller 111 in which the read image data is processed in accordance with the type of the printer 120 of the output destination, the type of the set sheet, or the print mode set through the operation panel 112 so as to create print data. The print data is temporarily stored in the main memory 113 and is transmitted to the computer 130 having transmitted a transmission permission signal via the network interface 114 (S216). At this time, the scanner 110 adds information on the destination printer 120 such as an IP address to a header of the print data. The transmitted data is stored in a spool folder on the HDD 133 by the application of the computer 130. Additionally, these processes are performed in an ON-THE-FLY manner. For this reason, the transmitted copy print data is erased from the memory 113 of the scanner 110 and is overwritten with new data. The main memory 113 has a capacity capable of storing an amount of data when a print original of an A0 size (841' 1189 mm) is read at a resolution of 600 dpi so that the scanner 110 can normally operate even when the scanner 110 and the printer 120 are connected one to one. On the other hand, when a print original which has a longitudinal length exceeds 1189 mm of an A0 size is read in the long print original mode, the size of the print data becomes larger than the data of an A0 size. However, since the data is transmitted to the computer 130 in the ON-THE-FLY manner, the data can be transmitted to the computer 130 before the main memory 113 becomes full if a transmission rate on the network 101 is sufficient.

The application on the computer 130 stores the copy data transmitted from the scanner 110, and then analyzes the destination printer information added to the header of the data and gets ready to transmit the print data to the printer (S217). When transmitting the data, the computer 130 acquires the information on the printer 120 and starts to transmit the print data to the printer 120 if the printer 120 is in a condition capable of receiving the data.

When the printer 120 receives the copy print data from the computer 130, the printer 120 converts the data into a print head driving signal by the printer controller 121 and performs a printing operation while temporarily storing the data in the main memory 122 (an execution of the printing operation). Subsequently, the print data is received from the computer 130 in response to a free space of the released main memory 122 while the printing operation is performed. Thus the printing operation of all print data is completed. The data transmission/reception process between the computer 130 and the printer 120 during this printing operation is generally the same as a case where the image data is transmitted by using the printer driver of the computer 130. The same process is performed also when the copy mode is to read a plurality of print originals. In this case, the scanner 110 enters a print original setting standby state after completely reading a first print original. When the print original is set, the user may press the start button. When the start button is pressed, the scanner 110 reads a new print original at the same setting as that of the first print original and transmits the copy data to the computer 130 used for spooling the copy data. Since the main memory 113 is freed after the data on the main memory 113 is transmitted to the computer 130, a print original after a second print original can be promptly read. When all print originals are completely read, the user can end the continuous reading mode by pressing an end button on the operation panel 112. The continuous reading mode may be set to be automatically ended after a predetermined time or more elapses from the time when no print original is set.

On the other hand, when the normal copy mode is determined (S206, S207), the following process is performed. Even when the normal copy mode is selected, a process changes in accordance with the state of the printer. The scanner 110 acquires the information on the printer 120 of the copy output destination and checks the state thereof (S208). The acquired state is checked (S209) and shows that the printer 120 is not in a busy state (a state where received data cannot be promptly processed due to a process such as a printing process), it is determined that the data can be directly transmitted from the scanner 110 to the printer 120 and the reading is started (S210). The print data is temporarily stored in the main memory 113 and is transmitted to the printer 120 in the ON-THE-FLY manner (S211). The printer 120 receives the print data from the scanner 110 and gets ready to start the printing (S212). Until the printing starts, the printer 120 sequentially receives the print data from the scanner 110 and temporarily stores the print data in the main memory 122 while converting the print data into the head driving signal by the printer controller 121. When the space of the main memory 122 becomes full, the network interface 123 temporarily stops the receiving of the data from the scanner 110. The data which is temporarily stored in the main memory 113 of the scanner 110 is erased if the data is transmitted, but is accumulated in the memory due to a printing speed of the printer 120, a recovery operation, and a temporary stop of the user. However, since a print data storage area of the main memory 113 is ensured to a degree corresponding to the read data of the print original of an A0 size, there is no need to stop the reading due to the full memory while the print original is read. When all print data is transmitted to the printer 120 and the printing of the printer 120 is completed, the copy operation is ended.

In a case where the printer 120 is determined to be in the busy state at step 209, the scanner 110 changes the copy print data destination to the computer 130 from the printer 120. Subsequently, the same process as that of the specific copy mode is performed. In the case of the normal copy mode, since all read data can be stored in the main memory 113 of the scanner 110, only the reading can be performed in a state where the data cannot be received by the printer 120 due to the busy state thereof. However, there is a possibility that the main memory 113 may not be freed if the data cannot be received by the printer even after a predetermined time elapses depending on the operation contents of the printer. Thus, the print data is transmitted to the computer 130 in order to free the main memory 113 at an early timing, and then different print originals can be also read.

Further, processes in a case where it is determined at step 203 that any response is not returned from the network 101 or a response prohibiting the receiving of the data is returned therefrom after the response request is transmitted from the scanner will be described. When there is no response from the network 101 or a response prohibiting the receiving of the data from the computer 130 after the response request is transmitted from the scanner 110, a standard operation of the MFP system only including the scanner 110 and the printer 120 is performed. That is, since it is not possible to select the long print original mode or the continuous reading mode for the plurality of print originals on the display unit of the operation panel 112 of the scanner 110, the user can press only a general setting and the copy start button (S219). When the copy start button is pressed (S220), the scanner 110 acquires the information on the printer 120 (S221). When the printer is not in the busy state (S222), the reading of the print original is started (S223). Here, when the printer is in the busy state, the scanner 110 periodically acquires the printer information until the printer 120 enters the standby state. When the print original is read, the read data is converted into the print data and is sequentially transmitted to the printer 120 (S224). Then, the print data is printed by the printer 120 (S225). Additionally, in the above-described process, there is no need to connect the computer 130 used for the spool to the network 101. In general, at least one computer 130 is connected to the same network in many cases in order to print an image file or a material on the computer 130 by the printer 120. Since only an application for realizing the spool function during the copy operation may be installed in the computer 130 in addition to a printer driver, there is no need to prepare a computer dedicated for the spooling.

According to the first embodiment of the present invention, the following effect can be obtained. When the computer 130 for spooling the copy print data is connected to the network 101, it is possible to read a long print original a size of which has a data size that exceeds the space of the main memory 113 of the scanner 110. In general, a speed at which the data is transmitted from the scanner 110 to the computer 130 via the network 101 is faster than a speed at which the scanner 110 reads an image and stores print data in the main memory 113. However, in a case where the data is received by the printer 120, there is a case where the receiving of the data is stopped due to a preliminary process of the printing operation or a temporary stop of the printing operation performed by the user. For that reason, there is a case where a speed at which the read data is stored in the memory becomes faster than a speed at which the data is transmitted to the printer 120. As a result, since the memory 113 becomes full, the reading operation is inevitably stopped. In such a case, when the print data destination is the computer 130, all data can be stored in the HDD 133 of the computer 130. Accordingly, it is possible to prevent a problem in which a reading operation is temporarily stopped when the space of the main memory 113 becomes full while the scanner 110 reads the long print original. When the reading operation is stopped while the image is read, the image quality is deteriorated, but this problem can be inhibited.

In the embodiment, a function expansion capable of handling a long print original exceeding A0 corresponding to a standard original size has been described. However, a function expansion which adds a reading mode having a higher resolution can be realized by the same configuration. For example, when a resolution corresponding to a standard is 600 dpi to maximum, it is possible to read a print original at 1200 dpi by the connection of the computer 130 used for the spool on the network 101. Further, since it is possible to solve a problem in which a next print original cannot be read until the copy print data is transmitted to the printer 120 even when a plurality of originals is copied, it is possible to shorten, for example, a time during which a user spends before the printer 120. Meanwhile, in a case where only one print original having a size standardized by the scanner 110 is copied, the copy print data is directly transmitted from the scanner 110 to the printer 120 when the printer 120 is not in the busy state at that time. Accordingly, it is possible to complete the printing operation at a timing earlier than a case where the print data is transmitted to the computer 130 used for the spool in the entire copy operation. Here, in the embodiment, a case has been described in which the scanner controller 111 in the scanner 110 has a printer driver function and the print data is created by the scanner. However, it is possible to employ an MFP system having a configuration in which the scanner 110 transmits RAW data or JPEG compressed data without processing the read data and the printer controller 121 of the printer 120 converts the read data into the print data.

Second Embodiment

A second embodiment of the present invention relates to a case where a spool application during a copy operation is installed in a plurality of computers connected to the network 101. Additionally, in the embodiment, the same process as that of the first embodiment will not be described.

FIG. 4 is a block diagram illustrating a configuration of an MFP system according to the second embodiment of the present invention. In the configuration shown in FIG. 1 according to the first embodiment, one computer 130 is connected to the network 101, but in the second embodiment, three computers 401, 411, and 421 are connected to the network 101. An application for spooling the copy data of the scanner 110 is installed in each of three computers 401, 411, and 421 and resides on the system while various settings are made.

In such a circumstance, when a user sets a print original on the scanner 110, the scanner 110 transmits a response request signal for a computer having an activated application for spooling the copy data to the network 101 similarly to the first embodiment. Then, when the computer 401, 411, or 421 receives the response request signal from the scanner 110 via the network 101, the computer searches the printer 120 of the output destination. When there is a response from the printer 120, the application determines that the data can be transmitted to the printer 120 of the copy destination and returns a response signal which permits the receiving of the data to the scanner 110 having requested the response.

At this time, each of the computers 401, 411, and 421 calculates a point for determining a transmission priority by referring to a speed or a use status of a CPU, a memory size, a space of a spool folder, and information on whether the copy data is spooled and adds the transmission priority to the response signal. For example, the point is set to 1 when the use rate of the CPU is 90 to 100% and the point is set to 10 when the use rate of the CPU is 0 to 10%. Similarly, the point is set to 1 when the use rate of the memory is 90 to 100% and the point is set to 10 when the use rate of the memory is 0 to 10%. The points may be added for each item or may be added as the sum of different coefficients of the items.

The scanner 110 which receives the response signal transmitted from each of the computers 401, 411, and 421 selects the information on the computer which first transmits the response of permitting the transmission among the computers and compares the computers by referring to the point representing the transmission priority and added to the computer. As a result, the computer (for example, the computer 401) having the high point is determined as the destination of the copy print data. When the user selects the long print original mode or the continuous reading mode and presses the copy start button, the read data is converted into the print data and is transmitted to the computer 401 having the highest point.

In a case where only one computer having the spool application installed therein is connected to the network 101 as in the first embodiment, the destination of the data is limited to the computer. When the computer performs, for example, a heavy process, there is a possibility that the processing capability is distributed and thus both performances in the copy operation and the process on the computer may be deteriorated. According to the present embodiment, it is possible to acquire information on the processing capability among the plurality of computers and to preferentially select the computer which is not used or the computer which performs a relatively light process. Further, it is possible to select the computer having high performance even in the same load circumstance. Accordingly, it is possible to expect high performance of the computer for the copy process.

Further, the above-described embodiment relates to a case where the controller 111 of the scanner 110 has a driver function of converting the read data into the print data. However, a case may be considered in which the scanner does not have a driver for converting the read data into the print data and the computer performs the converting process. In this case, there is a need to transmit the read data from the scanner 110 to the computer once in any condition. When the computer 130 converts the read data into the print data, the processing amount of the computer increases and thus the load increases. Accordingly, a certain degree of time needs to be ensured until it is ready to transmit the data to the printer 120. If only one computer can be used in a case where the print originals are continuously read in such a state, it is not possible to start the driver process for the next print original read data until the driver process of the first print original read data is completed. On the other hand, in the case of the configuration of the embodiment, the point included in the response signal to determine the priority becomes a low value while the data is transmitted to the first computer and the data is processed. For this reason, the other computer is selected as the destination of the second print original. Accordingly, a different computer can receive the data of the second print original and convert the data into the print data while a computer which receives the data of the first print original converts the data into the print data. As a result, it is possible to shorten or eliminate the standby time until the printer 120 receives the print data of the second print original after the printer 120 receives the print data of the first print original and completes the printing thereof.

Third Embodiment

Figure 5B:
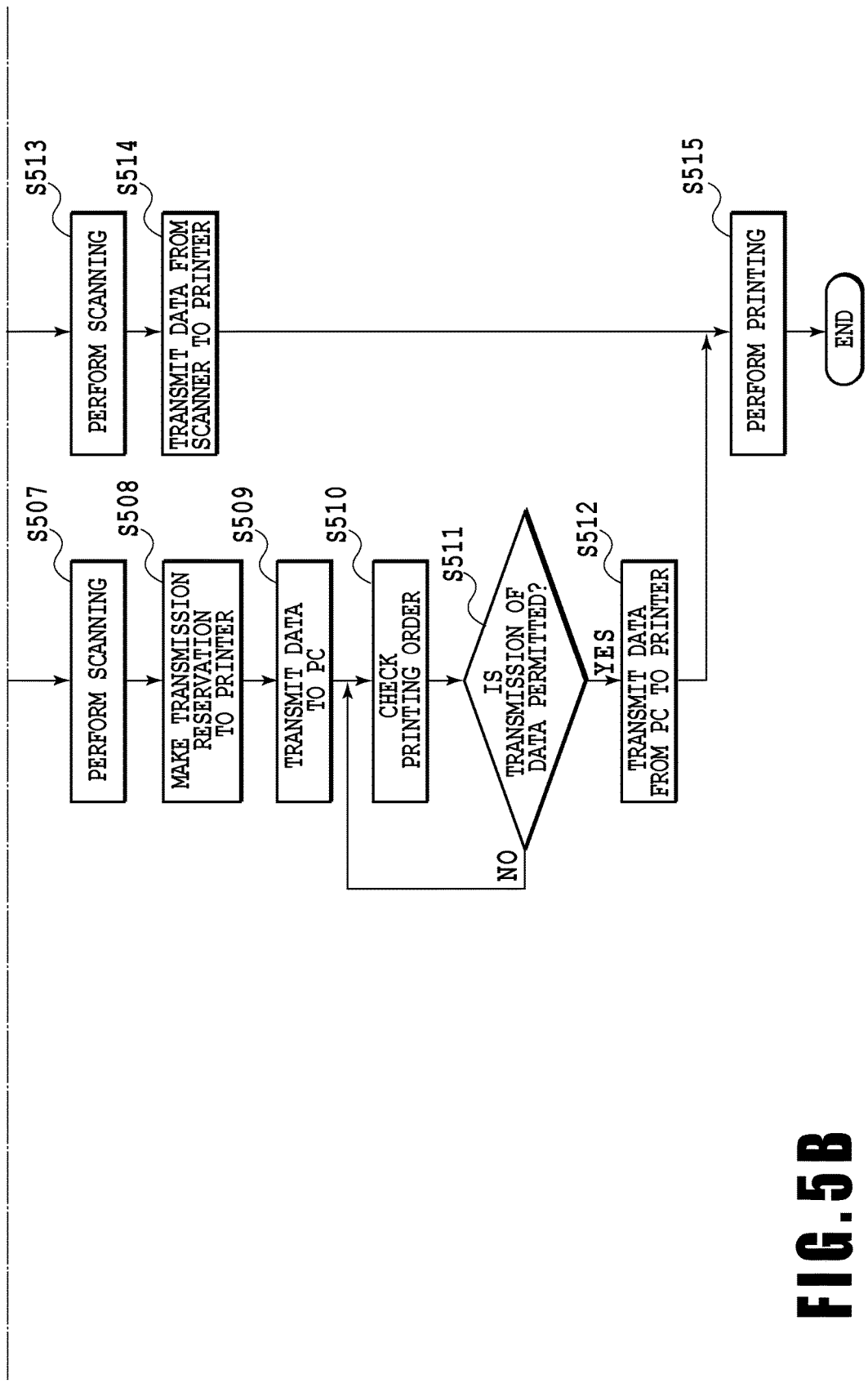
FIG. 5B is a flowchart illustrating a process of a copy operation of a MFP system according to a third embodiment of the invention.

A third embodiment of the present invention relates to a case where data obtained by the reading of a scanner is output to a printer in a reading order when a plurality of print originals is continuously copied. FIGS. 5A and 5B are flowcharts illustrating a process of a copy operation of an MFP system according to the third embodiment of the invention. It is assumed that a user sets a first print original and the computer 130 transmits a transmission permission signal as a result of the response request of the computer used for the spool (S503). Accordingly, the user operates the operation panel 112 (S504) to select a plural print original copy mode (continuous reading mode) and presses the start button (S505).

On the other hand, the scanner 110 determines whether the read data is transmitted to the printer 120 or the computer 130 (S506). When it is determined that the read data is transmitted to the computer 130 (S506), the reading is performed (S507) and a transmission reservation signal is transmitted to the printer 120 (S508). The transmission reservation signal is a part of the header of the print data and is minimum information that can confirm the match of the data when the print data is actually transmitted. The printer 120 having received the reservation signal stores the transmission reservation signal in the main memory 132 together with time information obtained when the data is received. The scanner 110 transmits the transmission reservation signal to the printer 120 and transmits the read data to the computer 130 while converting the read data into the print data (S509).

The computer 130 receives the copy print data from the scanner 110 and gets ready to transmit the copy print data to the printer 120 while storing the data in a spool space. At this time, it is checked whether the received copy data is at the highest rank of the printing order registered in the printer 120 (S510). The computer 130 transmits a part of the information of the header of the print data to the printer 120 and requests a response. The printer 120 compares a part of the information of the print data transmitted from the computer 130 with the information stored in the main memory 132 and checks whether the matching data is at the highest rank of the printing reservation order. When the data is at the highest rank of the printing reservation order, the printer 120 transmits a transmission permission signal to the computer 130. At this time, when the transmission data is not at the highest rank of the printing reservation order, a transmission prohibition signal for holding the transmission of the data is transmitted. When the computer 130 receives the transmission permission signal from the printer 120 (S511), the print data stored in the spool space is transmitted to the printer 120 (S512). When the printer 120 receives the data from the computer 130, the printer 120 performs a printing operation (S515).

In step 506, when the destination of the data is the printer 120 (S506), the print original is read (S513) and the data is transmitted to the printer 120 (S514).

When a plurality of computers used for the spool is connected to the network 101, there is a possibility that a timing at which the data is transmitted to the printer 120 may be changed in accordance with a difference in size of the print original or a difference in processing speed of the computer. On the other hand, according to the embodiment, it is possible to prevent a copy image from being output from the printer in an order different from the reading order of the scanner 110.

Fourth Embodiment

In the above-described embodiments, a destination of data is set to a computer used for the spool in a case where a plurality of print originals is read for a copy operation or a printer is busy when a print original is read. On the other hand, the present embodiment relates to a case where a copy operation is performed after a destination of data is determined on the basis of a state of a memory.

Figure 6B:
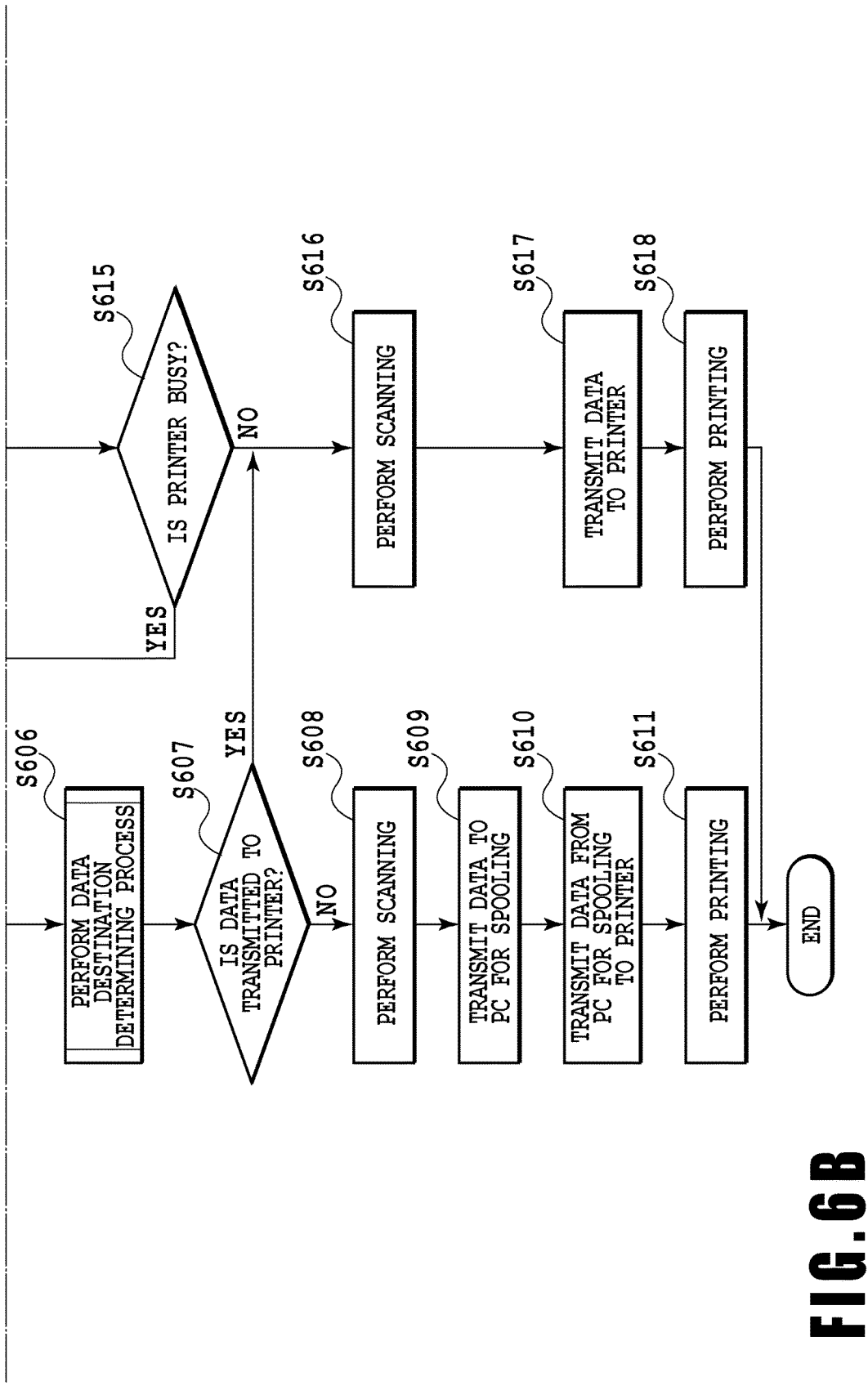
FIG. 6B is a flowchart illustrating a process of a copy operation of a MFP system according to a fourth embodiment of the invention.

FIGS. 6A and 6B are flowcharts illustrating a process of a copy operation of an MFP system according to a fourth embodiment of the present invention. In the process shown in FIGS. 6A and 6B, the same process as that of the first embodiment is performed in a case where the computer 130 used for the spool is not connected to the network 101 or a case where no data receiving permission response exists.

In FIGS. 6A and 6B, when the scanner 110 receives a data receiving permission signal from the computer 130 used for the spool on the network 101 (S603), the display unit of the operation panel 112 displays a state where a long print original can be copied or a plurality of print originals can be continuously copied. Here, when the user operates a panel (S604) and presses a copy start button (S605), the scanner 110 performs a process for determining the destination of the read data (S606).

Figure 7:
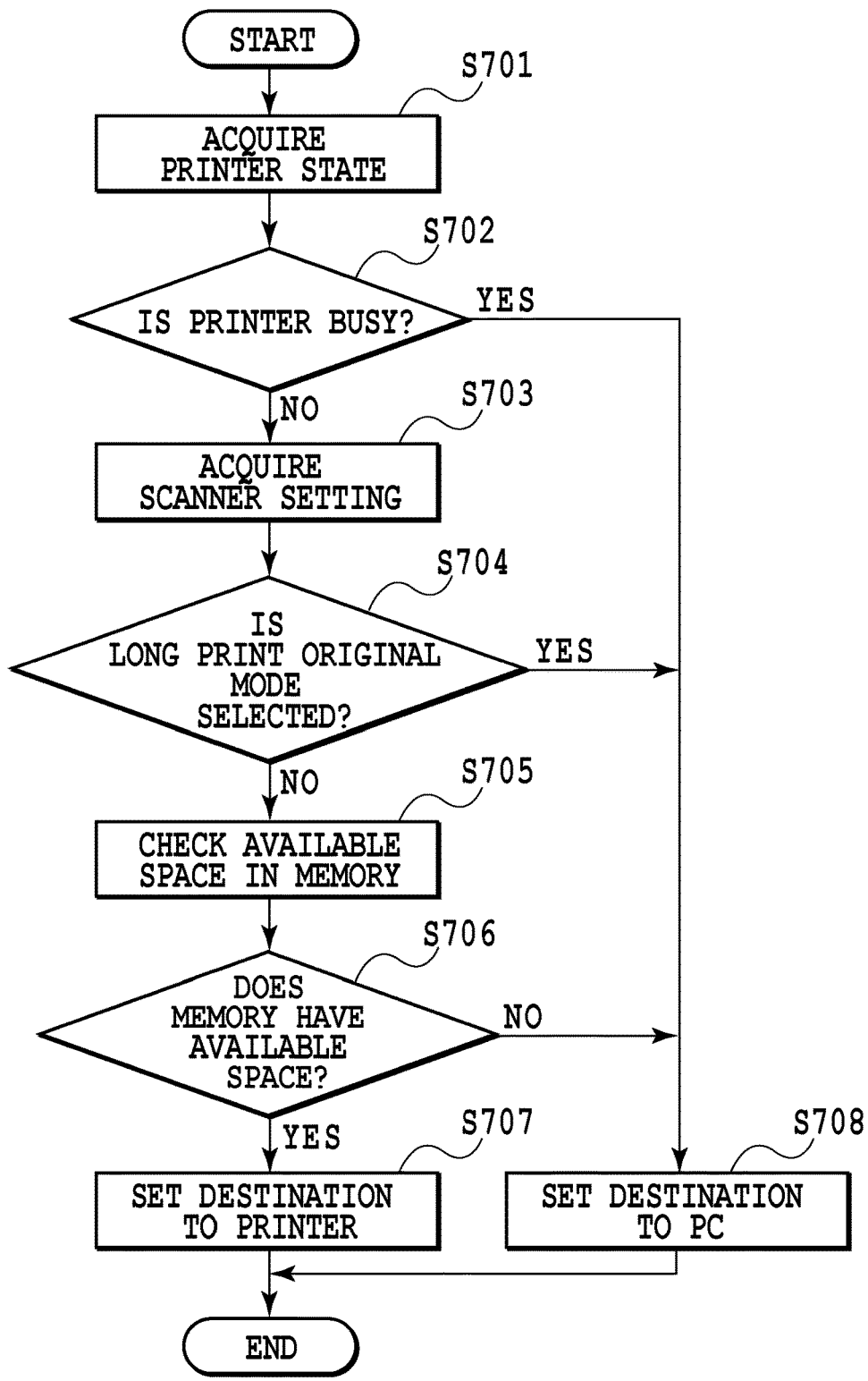
FIG. 7 is a flowchart illustrating a process for determining a destination of data according to the fourth embodiment.

FIG. 7 is a flowchart illustrating a process for determining the destination of the data according to the embodiment. The scanner 110 first acquires the state of the printer 120 of the copy destination and confirms the destination (S701). When the printer 120 is busy due to a process other than the copy process from the scanner 110 (S702), the destination of the read data is set to the computer 130 used for the spool (S708).

On the other hand, when the printer 120 is in the standby state or prints the copy data from the scanner 110, the scanner 110 refers to the setting information set by the operation panel 112 (S703) and checks whether a print original to be read is a long print original (S704). In a case of the long print original mode, the destination of the data is determined as the computer 130 used for the spool (S708).

On the other hand, when the setting is not the long print original mode (S704), a free space of the memory space is checked as the state of the memory which stores the print data on the main memory 113 (S705). For example, since a total space is empty when a first print original is read, the scanner 110 determines that the main memory 113 is empty (S706). When it is determined that the main memory 113 is empty, the scanner 110 sets the destination of the print data to the printer 120 (S707). A case where a print original is read from a second print original indicates a case where the transmission of the data of the previous print original is not completed due to the processing status and a part of the data is left. The size of the uncompressed data when reading an A0 size print original at 600 dpi is about 1.7 GB while the size of the print data that the main memory 113 can store is about 1.8 GB. In this configuration, in a case where a plurality of copies of an A1 size (594×841 mm) is copied at a resolution of 600 dpi, data of a first print original remaining in the main memory 113 is about 800 MB at maximum when a second print original is read. That is, the free space is about 1.0 GB. In the case of setting to continuously read print originals of the same size at the same resolution, since the size of the data of the second print original is similarly about 800 MB, the data can be additionally stored in the main memory 113. When the scanner 110 determines that the main memory 113 has a free space (S706), the destination of the copy print data of the second print original is also set to the printer 120. Here, in a case where the size of the print original is not set to a fixed form mode and is automatically detected, the size in the longitudinal direction is assumed to be a sheet size (A0) standardized by the scanner 110. For that reason, even when the second print original is set and a lateral width is equivalent to A1 (594 mm), a data size in the longitudinal direction is equivalent to A0 (1189 mm). In this case, since the free space is about 1.2 GB, it is determined that the main memory 113 does not have a free space when the actual free space is 1.0 GB. As a result, the destination of the copy print data of the second print original is set to the computer 130 used for the spool (S708).

Referring to FIGS. 6A and 6B again, when it is determined that the print data is transmitted to the computer 130 used for the spool by the process of determining the destination of the data in step 606 (S607), the scanner 110 reads the print original (S608) and transmits the print data to the computer 130 (S609). On the other hand, when it is determined that the print data is transmitted to the printer 120 (S607), the scanner 110 directly transmits the copy print data to the printer 120.

As described above, the scanner 110 predicts a data size necessary for reading a next print original with respect to the free space of the memory 113 of the scanner and determines whether or not there is a free space for each print original. Thus, for example, in the case of a low resolution setting (300 dpi), the print data size per print original is small and is about 400 MB even in an A0 size. Accordingly, at least four print originals can be processed without using the computer 130 used for the spool. Further, since the actual free space is determined, the data can be stably transmitted in accordance with the state of the printer 120. In some cases, more print originals can be transmitted without the computer 130 since the memory is released. In addition, since the required memory size is calculated with the assumed maximum shape, even if the size of the print original to be continuously read is different, it is possible to prevent, for example, a problem in which the reading stops halfway when the memory becomes full due to a wrong judgment. According to the embodiment, since it is possible to minimize the use of the computer 130 used for the spool, it is possible to suppress the load or power consumption of the computer 130 and the traffic increase of the network 101.

Other Embodiments

The invention can be also realized in a process in which a program realizing one or more of the functions of the above-described embodiments is provided in a system or apparatus via a network or storage medium and one or more processors in the computer of the system or apparatus reads the program. Further, the invention can be realized by a circuit (for example, an ASIC) that realizes one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070689 filed Mar. 31, 2016, which is hereby incorporated by reference wherein in its entirety.

What is claimed is:

1. A printer multifunction system comprising a printer having a printer controller and a scanner having a scanner controller and a memory configured to store data obtained by reading a print original by a sensor,
    wherein the printer and the scanner are connected to a network to which a computer is connected,
    wherein the scanner controller determines whether to transmit the data stored in the memory to the printer or the computer, based on at least one of a state of the printer, a reading setting of the scanner, and a state of the memory, and causes the scanner to transmit the data stored in the memory to a destination determined by the scanner controller,
    wherein the printer controller receives the data from the scanner in a case where the data is transmitted to the printer, and receives the data from the computer in a case where the data is transmitted to the computer from the scanner, and
    the printer controller causes the printer to execute a printing operation, based on the data.

2. The printer multifunction system according to claim 1, wherein the scanner controller determines whether to transmit the data to the printer or the computer based on a size of the print original read by the scanner as the reading setting of the scanner.

3. The printer multifunction system according to claim 1, wherein the scanner controller further determines whether to transmit the data to the printer or the computer based on a response which is transmitted from the computer to indicate whether the data is able to be transmitted to the printer.

4. The printer multifunction system according to claim 1, wherein in a case where the data is transmitted to the computer, the scanner controller transmits the data to which information on the printer executing the printing operation is added and the computer specifies the printer to which the data is transmitted based on the information on the printer.

5. The printer multifunction system according to claim 1, wherein the computer notifies information on own data processing capability to the scanner controller and the scanner controller determines a computer to which the data is to be transmitted based on the information on the processing capability in a case where a plurality of computers is connected to the network.

6. The printer multifunction system according to claim 1, wherein in a case where the data is transmitted to the computer, the scanner controller makes a reservation to transmit the data to the printer and the printer determines whether the data is able to be transmitted from the computer based on the transmission reservation.

7. The printer multifunction system according to claim 1, wherein the scanner controller compares a free space of the memory as the state of the memory with a maximum size predicted as data of a next reading print original and determines whether to transmit the data to the printer or the computer based on the comparison.

8. The printer multifunction system according to claim 1, wherein the reading setting includes a long print original mode or a continuous reading mode,
    wherein the scanner controller determines to transmit the data to the computer, in a case where the reading setting is the long print original mode or the continuous reading mode.

9. The printer multifunction system according to claim 1, wherein the scanner controller checks a free space of the memory as the state of the memory, and
    wherein the scanner controller determines to transmit the data to the printer, in a case where the memory has a predetermined free space, and
    wherein the scanner controller determines to transmits the data to the computer, in a case where the memory does not have the predetermined free space.

10. A scanner connected to a network to which a printer and a computer are connected, the scanner comprising:
    a scanner controller; and
    a memory configured to store data obtained by reading a print original by a sensor,
    wherein the scanner controller determines whether to transmit the data stored in the memory to the printer or the computer, based on at least one of a state of the printer, a reading setting of the scanner, and a state of the memory, and causes the scanner to transmit the data stored in the memory to a destination determined by the scanner controller, and
    wherein the printer receives the data from the scanner in a case where the data is transmitted to the printer, and receives the data from the computer in a case where the data is transmitted to the computer from the scanner, and
    the printer executes a printing operation, based on the data.

11. The scanner according to claim 10, wherein the scanner controller determines whether to transmit the data to the printer or the computer based on a size of the print original read by the scanner as the reading setting of the scanner.

12. The scanner according to claim 10, wherein the scanner controller further determines whether to transmit the data to the printer or the computer based on a response which is transmitted from the computer to indicate whether the data is able to be transmitted to the printer.

13. The scanner according to claim 10, wherein in a case where the data is transmitted to the computer, the scanner controller transmits the data to which information on the printer executing the printing operation is added and the computer specifies the printer to which the data is transmitted based on the information on the printer.

14. The scanner according to claim 10, wherein the computer notifies information on own data processing capability to the scanner controller and the scanner controller determines a computer to which the data is to be transmitted based on the information on the processing capability in a case where a plurality of computers is connected to the network.

15. The scanner according to claim 10, wherein in a case where the data is transmitted to the computer, the scanner controller makes a reservation to transmit the data to the printer and the printer determines whether the data is able to be transmitted from the computer based on the transmission reservation.

16. The scanner according to claim 10, wherein the scanner controller compares a free space of the memory as the state of the memory with a maximum size predicted as data of a next reading print original and determines whether to transmit the data to the printer or the computer based on the comparison.

17. The scanner according to claim 10, wherein the reading setting includes a long print original mode or a continuous reading mode,
wherein the scanner controller determines to transmit the data to the computer, in a case where the reading setting is the long print original mode or the continuous reading mode.

18. The scanner according to claim 10, wherein the scanner controller checks a free space of the memory as the state of the memory, and
wherein the scanner controller determines to transmit the data to the printer, in a case where the memory has a predetermined free space, and
wherein the scanner controller determines to transmits the data to the computer, in a case where the memory does not have the predetermined free space.

19. A printing method by a printer multifunction system configured to include a printer and a scanner having a memory configured to store data obtained by reading a print original by a sensor, wherein the printer and the scanner are connected to a network to which a computer is connected, the method comprising the steps of:
determining whether to transmit the data stored in the memory to the printer or the computer, based on at least one of a state of the printer, a reading setting of the scanner, and a state of the memory
causing the scanner to transmit the data stored in the memory to a determined destination;
causing the printer to receive the data from the scanner in a case where the data is transmitted to the printer, and to receive the data from the computer in a case where the data is transmitted to the computer from the scanner; and
causing the printer to execute a printing operation, based on the data.

* * * * *